United States Patent
Iwase (10) Patent No.: US 9,430,171 B2
(45) Date of Patent: Aug. 30, 2016

(54) MANAGEMENT APPARATUS, MANAGEMENT METHOD, NON-TRANSITORY COMPUTER READABLE MEDIUM, AND INFORMATION PROCESSING SYSTEM

(75) Inventor: Kazuhisa Iwase, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 954 days.

(21) Appl. No.: 13/594,096

(22) Filed: Aug. 24, 2012

(65) Prior Publication Data

US 2013/0254362 A1    Sep. 26, 2013

(30) Foreign Application Priority Data

Mar. 22, 2012 (JP) ................. 2012-066262

(51) Int. Cl.
| | |
|---|---|
| *G06F 15/16* | (2006.01) |
| *G06F 3/12* | (2006.01) |
| *H04L 29/06* | (2006.01) |
| *H04N 1/00* | (2006.01) |

(52) U.S. Cl.
CPC ........... *G06F 3/1222* (2013.01); *G06F 3/1238* (2013.01); *G06F 3/1287* (2013.01); *G06F 3/1288* (2013.01); *H04L 63/0218* (2013.01); *H04L 63/104* (2013.01); *H04N 1/00344* (2013.01)

(58) Field of Classification Search
CPC .... G06F 17/00; G06F 3/1222; G06F 3/1238; G06F 3/1287; G06F 3/1288; H04L 63/0218; H04L 63/104; H04N 1/00344
See application file for complete search history.

(56) References Cited

U.S. PATENT DOCUMENTS

| 2005/0216514 A1 | 9/2005 | Murata |
| 2008/0028436 A1* | 1/2008 | Hannel ............... H04L 63/0218 726/1 |

FOREIGN PATENT DOCUMENTS

| JP | 2005-271317 A | 10/2005 |
| JP | 2005-285008 A | 10/2005 |
| JP | 2005-338935 A | 12/2005 |

(Continued)

OTHER PUBLICATIONS

Japanese Unexamined Patent Application Publication No. 2009-145972, An English machine translation of this document, provided by the Japan Patent Office, is attached with a copy of this document.

(Continued)

*Primary Examiner* — Lance L Barry
*Assistant Examiner* — Keyvan Emdadi
(74) *Attorney, Agent, or Firm* — Sughrue Mion, PLLC (57) ABSTRACT

A management apparatus includes a user information management unit, a device information management unit, and a controller. The user information management unit manages information about groups to which individual users belong, in association with user identification information identifying the users. The device information management unit manages, for one device or each of plural devices, information about a main group to which the device belongs and information about a sub-group for which use of the device is permitted, in association with each other. The controller controls, when accepting a request for using a device from an information terminal, use of the device in accordance with whether or not information about a group managed in association with user identification information of a user who operates the information terminal is included in information about the main group or sub-group managed in association with the device.

7 Claims, 10 Drawing Sheets

(56) References Cited

FOREIGN PATENT DOCUMENTS

| | | |
|---|---|---|
| JP | 2008-310383 A | 12/2008 |
| JP | 2009-145972 A | 7/2009 |

OTHER PUBLICATIONS

Japanese Unexamined Patent Application Publication No. 2005-285008, An English machine translation of this document, provided by the Japan Patent Office, is attached with a copy of this document.

Japanese Unexamined Patent Application Publication No. 2005-338935, An English machine translation of this document, provided by the Japan Patent Office, is attached with a copy of this document.

Japanese Unexamined Patent Application Publication No. 2008-310383, An English machine translation of this document, provided by the Japan Patent Office, is attached with a copy of this document.

Communication dated Dec. 22, 2015, issued by the Japan Patent Office in corresponding Japanese Application No. 2012-066262.

* cited by examiner

| USER ID | PASSWORD | DEPARTMENT USER BELONGS TO | TENANT ID |
|---|---|---|---|
| U0001 | XXXX | GENERAL AFFAIRS | TA |
| U0002 | XXXX | DEVELOPMENT | TA |
| U0003 | XXXX | GENERAL AFFAIRS | TB |
|  |  |  |  |

FIG. 6

| DEVICE ID | DEVICE NAME | TENANT ID | PERMITTED-TENANT ID | OUT-OF-TENANT USAGE CONDITION | OUT-OF-TENANT RELEASE CONDITION |
|---|---|---|---|---|---|
| D0001 | PRINTER 20A | TA | — | — | — |
| D0002 | PRINTER 20B | TA | — | — | — |
| D0003 | PRINTER 20C | TA | — | — | — |
| D0004 | PRINTER 20D | TB | — | AFTER-USE CHARGING | PRINTER NAME |
| | | | | | |

| DEVICE ID | DEVICE NAME | TENANT ID | PERMITTED-TENANT ID | OUT-OF-TENANT USAGE CONDITION | OUT-OF-TENANT RELEASE CONDITION |
|---|---|---|---|---|---|
| D0001 | PRINTER 20A | TA | TC | — | — |
| D0002 | PRINTER 20B | TA | TC | — | — |
| D0003 | PRINTER 20C | TA | TC | — | — |
| D0004 | PRINTER 20D | TB | TC | AFTER-USE CHARGING | PRINTER NAME |
|  |  |  |  |  |  |

| USER ID | PASSWORD | DEPARTMENT USER BELONGS TO | TENANT ID |
|---|---|---|---|
| U0001 | XXXX | GENERAL AFFAIRS | TD |
| U0002 | XXXX | DEVELOPMENT | TE |
| U0003 | XXXX | GENERAL AFFAIRS | TB |
|  |  |  |  |

FIG. 13

| DEVICE ID | DEVICE NAME | TENANT ID | PERMITTED-TENANT ID | OUT-OF-TENANT USAGE CONDITION | OUT-OF-TENANT RELEASE CONDITION |
|---|---|---|---|---|---|
| D0001 | PRINTER 20A | TA | TD | — | — |
| D0002 | PRINTER 20B | TA | TD, TE | — | — |
| D0003 | PRINTER 20C | TA | TE | — | — |
| D0004 | PRINTER 20D | TB | — | AFTER-USE CHARGING | PRINTER NAME |
|  |  |  |  |  |  |

MANAGEMENT APPARATUS, MANAGEMENT METHOD, NON-TRANSITORY COMPUTER READABLE MEDIUM, AND INFORMATION PROCESSING SYSTEM

CROSS-REFERENCE TO RELATED APPLICATIONS

This application is based on and claims priority under 35 USC 119 from Japanese Patent Application No. 2012-066262 filed Mar. 22, 2012.

BACKGROUND (i) Technical Field

The present invention relates to a management apparatus, a management method, a non-transitory computer readable medium, and an information processing system.

(ii) Related Art

Systems are available in which a server for managing a device is provided on a network (e.g., the Internet) side (cloud side), and a client apparatus requests a process to the server thereby causing the device to perform the process. Such systems are called cloud services.

SUMMARY

According to an aspect of the invention, there is provided a management apparatus including a user information management unit, a device information management unit, and a controller. The user information management unit manages information about groups to which individual users belong, in association with user identification information identifying the users. The device information management unit manages, for one device or each of plural devices, information about a main group to which the device belongs and information about a sub-group, which is different from the main group, for which use of the device is permitted, in association with each other. The controller controls, when accepting a request for using a device from an information terminal, use of the device specified by the request in accordance with whether or not information about a group managed by the user information management unit in association with user identification information of a user who operates the information terminal is included in information about the main group or sub-group managed by the device information management unit in association with the device specified by the request.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the attached drawings.

1. System Configuration

Figure 1:
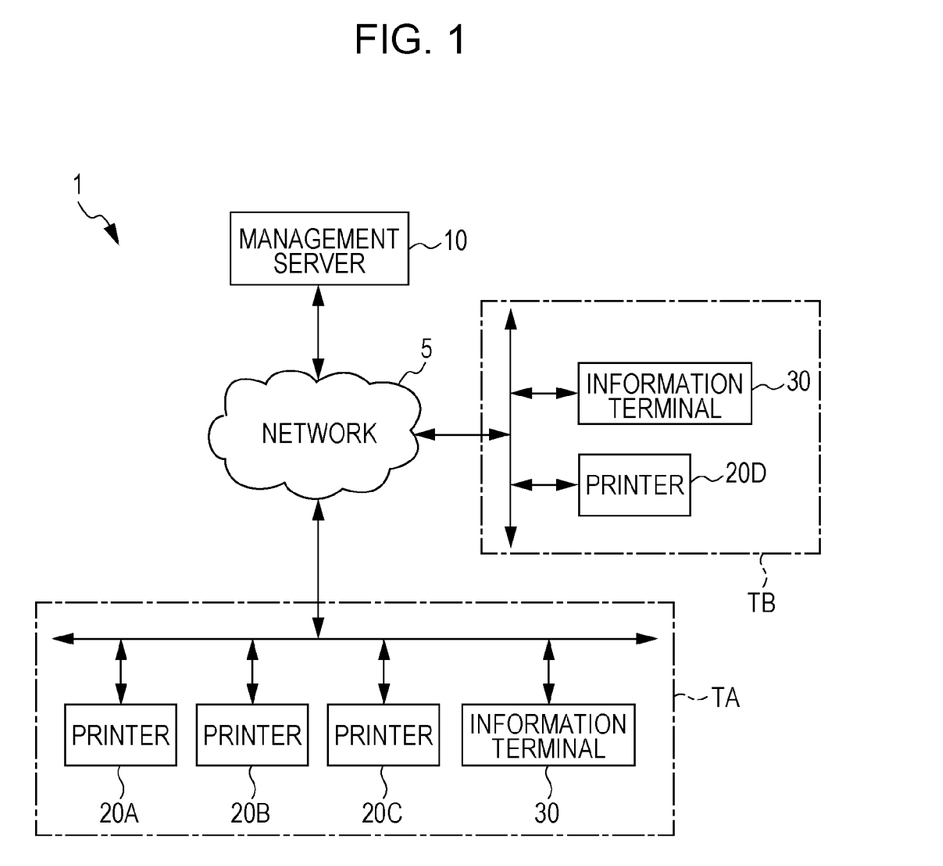
FIG. 1 is a diagram illustrating a configuration of an information processing system according to an exemplary embodiment of the invention.

FIG. 1 illustrates a configuration of an information processing system 1 according to the exemplary embodiment. As illustrated in FIG. 1, the information processing system 1 includes a management server 10, a tenant system TA, and a tenant system TB. Each of the tenant systems TA and TB is connected to the management server 10 so as to be able to communicate with each other via a network 5.

A tenant system is a unit that constitutes a single group to which a service is provided by the management server 10, and includes devices, such as one or more system printers (20A to 20D) and an information terminal (30). In the tenant system, use of a device is controlled by the management server 10, the information terminal requests use of a device (printer) to the management server 10, and the device (printer) processes the request from the information terminal in accordance with control performed by the management server 10.

In the exemplary embodiment, the tenant system TA includes printers 20A, 20B, and 20C, and an information terminal 30. The tenant system TB includes a printer 20D and an information terminal 30. The tenant systems TA and TB may be logical management groups, and these systems may not necessarily be physically separated from each other. Hereinafter, each of the printers 20A, 20B, 20C, and 20D is referred to as a printer 20 when it is not necessary to distinguish them from one another.

The management server 10 is a computer that manages information about devices included in plural tenant systems, and that controls use of a device in accordance with a request for using the device included in a tenant system upon receiving the request from the information terminal 30. Hereinafter, the configurations of the management server 10, printers 20, and information terminal 30 included in the information processing system 1 will be described with reference to FIGS. 2 to 4.

1.1 Management Server 10

Figure 2:
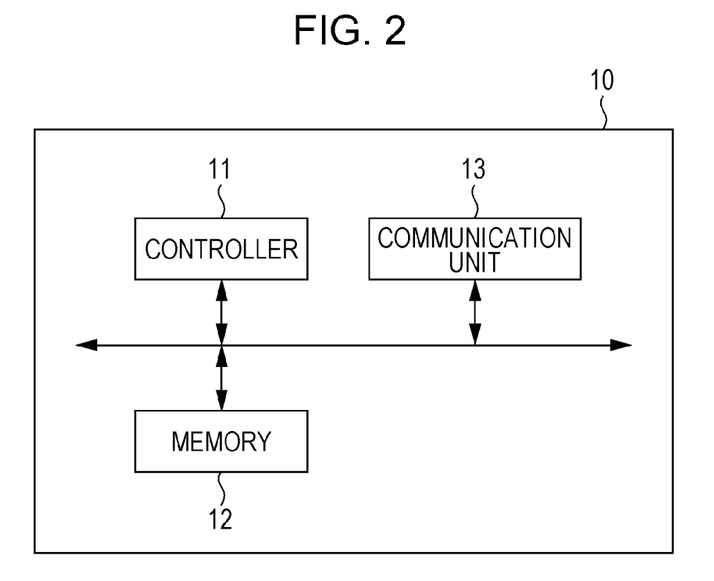
FIG. 2 is a diagram illustrating an example of a hardware configuration of a management server.

FIG. 2 illustrates an example of a hardware configuration of the management server 10. As illustrated in FIG. 2, the management server 10 includes a controller 11, a memory 12, and a communication unit 13.

The controller 11 includes a central processing unit (CPU), and executes various processing operations and controls the individual units of the management server 10 in accordance with programs stored in the memory 12.

The memory 12 stores a control program, such as the operating system of the management server 10, and data, and is used as a working memory for the controller 11. The program may be supplied to the management server 10 in the state of being stored in an information storage medium, such as an optical disc, a magnetic disk, a magnetic tape, a magneto-optical disc, or a flash memory, or may be supplied to the management server 10 via a data communication medium, such as the Internet. Hereafter, an example of the data stored in the memory 12 will be described.

Figure 5:
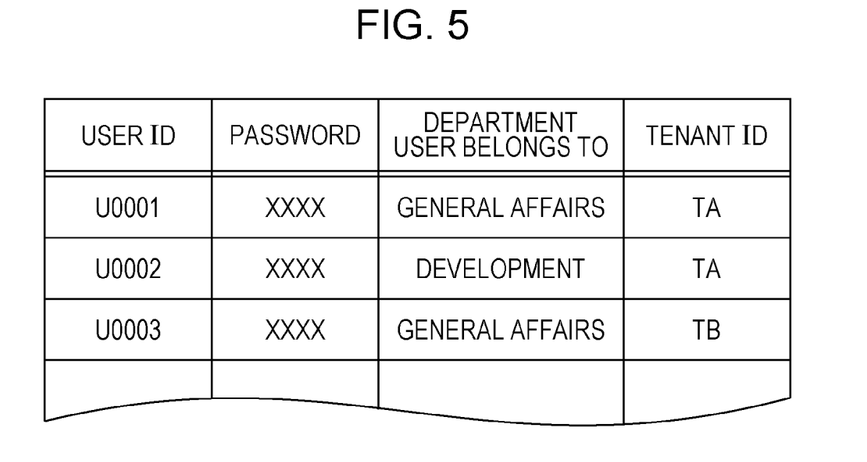
FIG. 5 is a diagram illustrating an example of a user information management table.

FIG. 5 illustrates an example of a user information management table stored in the memory 12. The user information management table illustrated in FIG. 5 stores user IDs identifying users, passwords, departments users belong to, and tenant IDs identifying tenant systems to which users belong, in association with one another.

Figure 6:
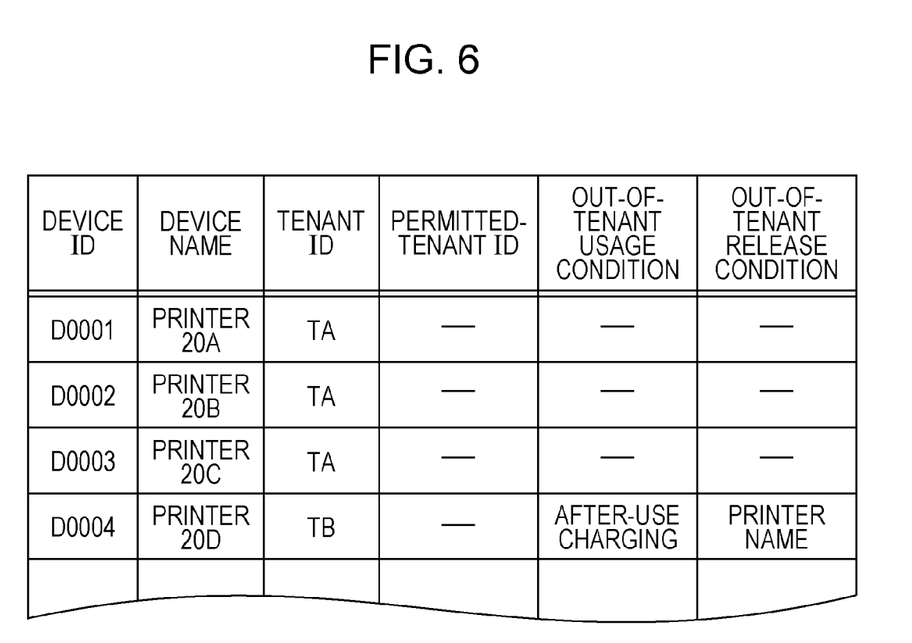
FIG. 6 is a diagram illustrating an example of a resource information management table.

FIG. 6 illustrates an example of a resource information management tale stored in the memory 12. The resource information management table illustrated in FIG. 6 stores device IDs identifying devices, device names, tenant IDs identifying tenant systems to which devices belong, permitted-tenant IDs identifying tenant systems for which use of devices are permitted, out-of-tenant usage conditions indicating usage conditions in a tenant system other than the tenant system to which a device belongs, and out-of-tenant release conditions indicating information released to a tenant system other than the tenant system to which a device belongs, in association with one another.

In the resource information management table illustrated in FIG. 6, no information is stored in the field of permitted-tenant ID corresponding to the device IDs belonging to any tenant system. This indicates that the tenant systems TA and TB are independent from each other, as in the information processing system 1 illustrated in FIG. 1. According to the resource information management table illustrated in FIG. 6, in a case where a user who belongs to a tenant system other than the tenant system having the tenant ID "TB" uses the device having the device ID "D0004", after-use charging is applied to the user. Also, information about the printer name of the device having the device ID "D0004" is released to a tenant system other than the tenant system having the tenant ID "TB".

The communication unit 13 includes a network interface card or the like, and is connected to the network 5 via the network interface card. Accordingly, the communication unit 13 performs data communication with the tenant systems TA and TB via the network 5.

1.2 Printer 20

Figure 3:
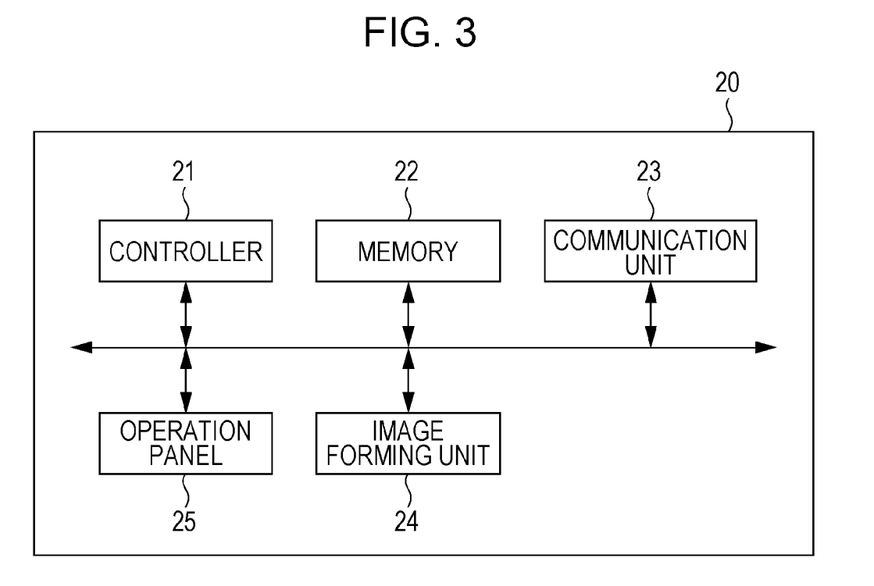
FIG. 3 is a diagram illustrating an example of a hardware configuration of a printer.

Next, each of the printers 20 will be described in detail. The printer 20 is a device that performs an image formation process in accordance with control performed by the management server 10.

FIG. 3 illustrates an example of a hardware configuration of the printer 20. As illustrated in FIG. 3, the printer 20 includes a controller 21, a memory 22, a communication unit 23, an image forming unit 24, and an operation panel 25.

The controller 21 includes a CPU, and executes various processing operations and controls the individual units of the printer 20 in accordance with programs stored in the memory 22.

The memory 22 stores a control program for the printer 20 and data, and is used as a working memory for the controller 21. The program may be supplied to the printer 20 in the state of being stored in an information storage medium, such as an optical disc, a magnetic disk, a magnetic tape, a magneto-optical disc, or a flash memory, or may be supplied to the printer 20 via a data communication medium, such as the Internet.

The communication unit 23 includes a network interface card, and performs data communication with the management server 10 via the network interface card.

The image forming unit 24 forms an image on a printing medium (printing sheet) supplied from a sheet tray, in response to an image formation instruction (print job) received from the controller 21. The image forming unit 24 may form an image by using a laser printer scheme or an inkjet printer scheme.

The operation panel 25 is an input device with a display function, and includes a display device, such as a liquid crystal display, and a button-type or touch-panel-type input device. The operation panel 25 functions as an interactive interface used by a user who operates the printer 20.

1.3 Information Terminal 30

Figure 4:
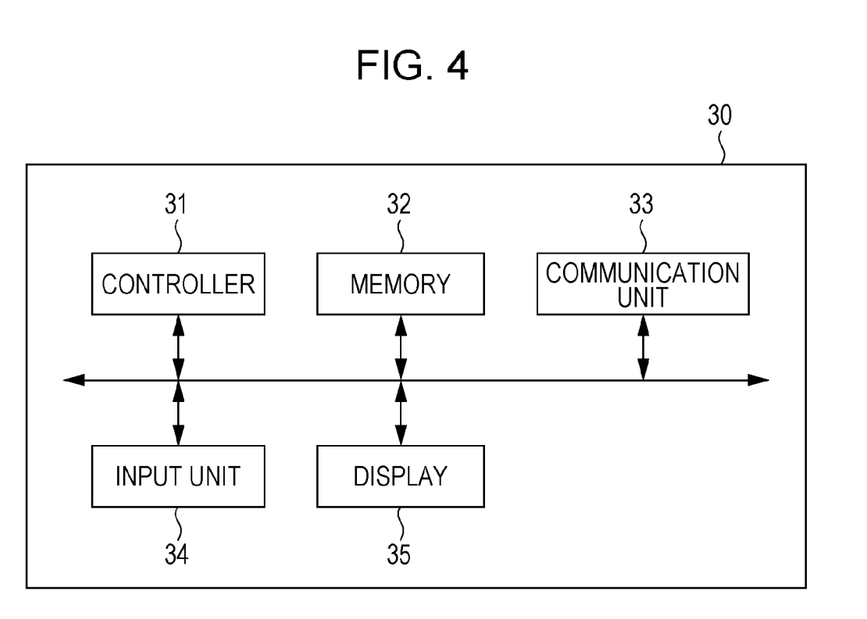
FIG. 4 is a diagram illustrating an example of a hardware configuration of an information terminal.

The information terminal 30 will be described in detail. The information terminal 30 is a computer operated by a user, such as a personal computer, a mobile phone, a personal digital assistant (PDA), or a tablet terminal.

FIG. 4 illustrates an example of a hardware configuration of the information terminal 30. As illustrated in FIG. 4, the information terminal 30 includes a controller 31, a memory 32 a communication unit 33, an input unit 34, and a display 35.

The controller 31 includes a CPU, and executes various processing operations and controls the individual units of the information terminal 30 in accordance with programs stored in the memory 32.

The memory 32 stores a control program, such as the operating system of the information terminal 30, and data, and is used as a working memory for the controller 31. The program may be supplied to the information terminal 30 in the state of being stored in an information storage medium, such as an optical disc, a magnetic disk, a magnetic tape, a magneto-optical disc, or a flash memory, or may be supplied to the information terminal 30 via a data communication medium, such as the Internet.

The communication unit 33 includes a network interface card or the like, and communicates with the management server 10 via the network interface card.

The input unit 34 is constituted by an input device such as a touch panel, a keyboard, or the like, and accepts an operation input by a user.

The display 35 is constituted by a display device, such as a liquid crystal display, and displays a result (screen) of information processing performed by the controller 31.

2. Integration of Tenant Systems

Figure 7:
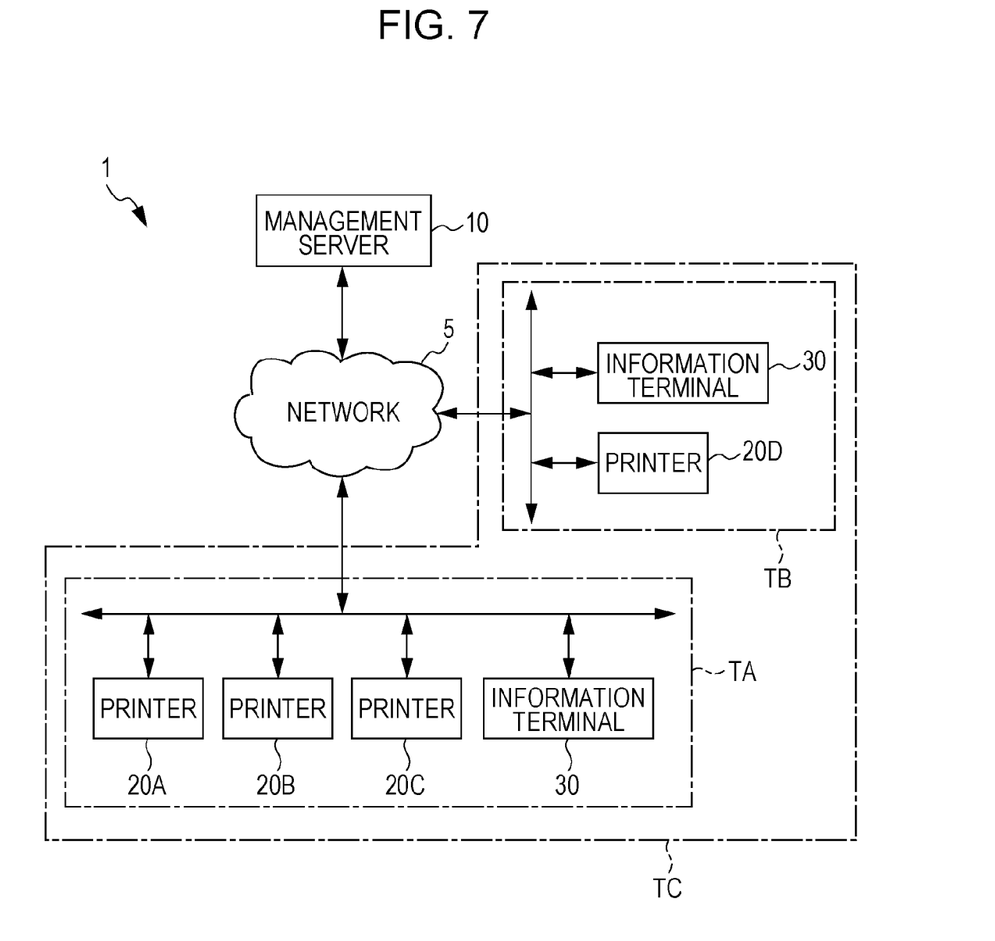
FIG. 7 is a diagram illustrating a configuration of the information processing system in which tenant systems have been integrated.

Description will be given of a process that is performed in the case of integrating the tenant systems TA and TB illustrated in FIG. 1 to generate the tenant system C illustrated in FIG. 7.

Figure 8:
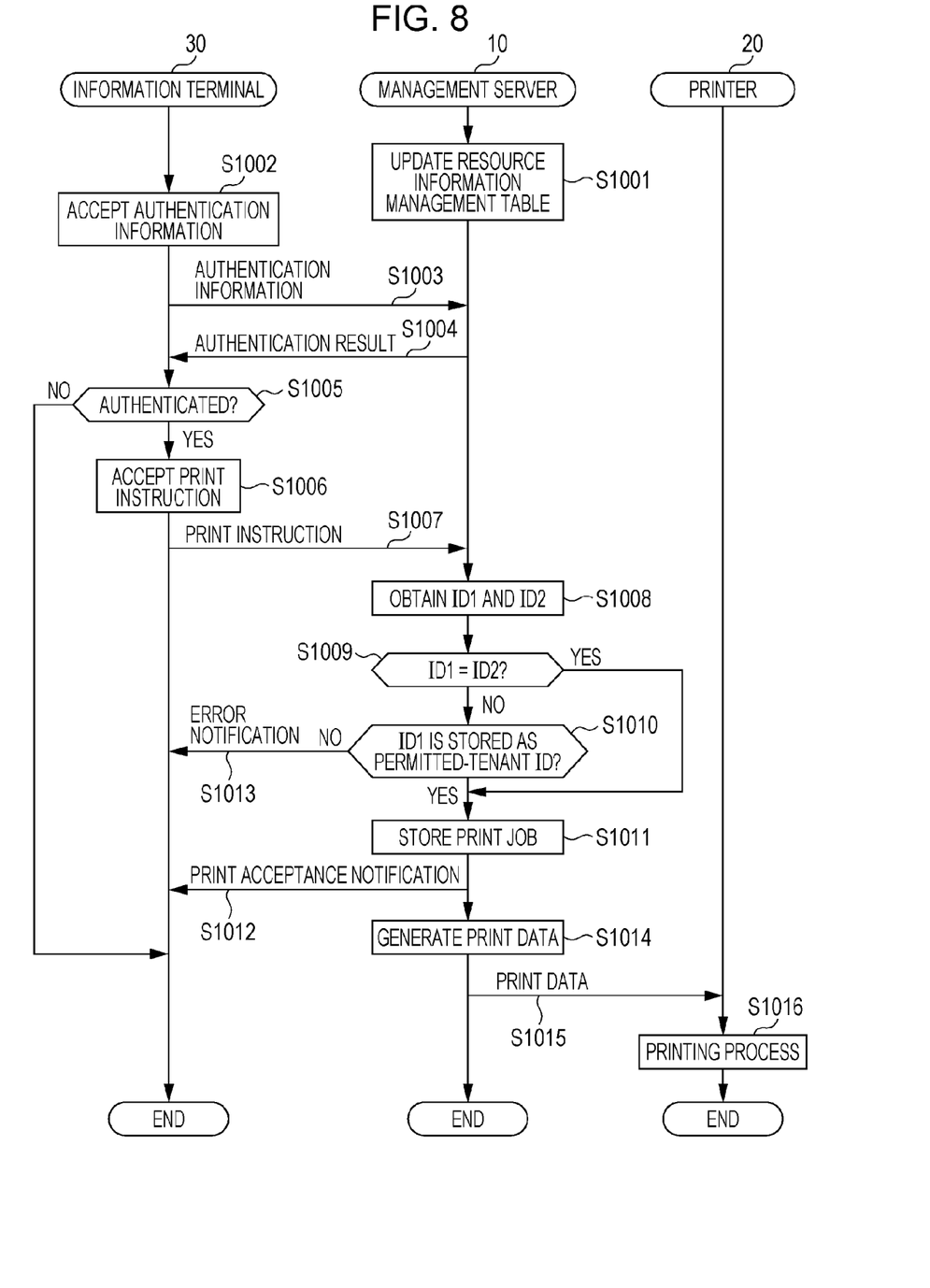
FIG. 8 is a sequence diagram of a process which is performed for integrating tenant systems.

FIG. 8 illustrates a process of integrating the tenant systems and a sequence of processing a print request accepted by the management server 10 from the information terminal 30 after the integration.

As illustrated in FIG. 8, in the case of integrating the tenant systems TA and TB to generate the tenant system TC, the management server 10 stores a new tenant ID identifying the tenant system TC in the field of permitted-tenant ID in the resource information management table, and thereby updates the resource information management table in step S1001.

Figure 9:
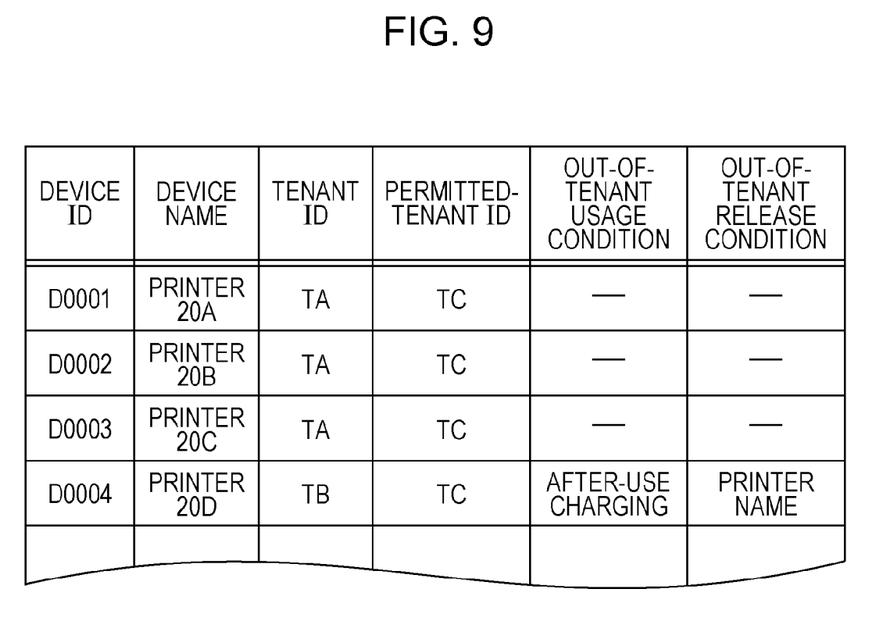
FIG. 9 is a diagram illustrating an example of the resource information management table after integration.

Specifically, as illustrated in FIG. 9, the management server 10 extracts, from the resource information management table, the records (device IDs) containing the tenant IDs (TA and TB) of the tenant systems to be integrated, stores, in the field of permitted-tenant ID of the extracted records, the tenant ID (TC) of the tenant system generated through the integration, and thereby updates the resource information management table.

Subsequently, when the information terminal 30 accepts authentication information (user ID and password) from a user in step S1002, the information terminal 30 transmits the accepted authentication information to the management server 10 in step S1003, so as to request user authentication.

The management server 10 performs user authentication by using the authentication information received from the information terminal 30, and transmits an authentication result to the information terminal 30 in step S1004.

If the authentication result is negative (NO in step S1005), the process ends. If the authentication result is positive (YES in step S1005), the information terminal 30 notifies the user that the user has successfully logged in.

When the information terminal 30 accepts in step S1006, from the user, a print instruction in which the data to be printed and the printer at an output destination (hereinafter referred to as a destination printer) are specified, the information terminal 30 transmits the accepted print instruction to the management server 10 in step S1007.

In step S1008, the management server 10 obtains the tenant ID (ID1) associated with the user ID of the authenticated user in the user information management table, and also obtains the tenant ID (ID2) associated with the device ID of the destination printer in the resource information management table. If ID1 is different from ID2 (NO in step S1009), the management server 10 determines in step S1010 whether or not ID1 is stored in the field of permitted-tenant ID corresponding to the device ID of the destination printer in the resource information management table.

If it is determined in step S1009 that ID1 is identical to ID2 (YES in step S1009), or if it is determined in step S1010 that ID1 is stored in the field of permitted-tenant ID corresponding to the device ID of the destination printer in the resource information management table (YES in step S1010), the management server 10 accepts the print instruction regarding the request from the information terminal 30, stores a print job in a spooler in step S1011, and transmits a print acceptance notification to the information terminal 30 in step S1012. If it is determined in step S1010 that ID1 is not stored in the field of permitted-tenant ID corresponding to the device ID of the destination printer in the resource information management table (NO in step S1010), the management server 10 transmits an error notification to the information terminal 30 in step S1013.

In step S1014, the management server 10 generates print data having a format that may be processed by the destination printer, in accordance with the stored print job. The management server 10 monitors the status of the destination printer. When the destination printer becomes capable of processing the print data generated in step S1014, the management server 10 transmits the print data to the printer in step S1015.

The printer performs a printing process by using the print data received from the management server 10 in step S1016, and the process ends.

According to the above-described process, the resource information management table is updated, and thereby system transition may be performed by inheriting the settings that are used before integration.

3. Division of Tenant System

Description will be given of a process of dividing the tenant system TA illustrated in FIG. 1 into the tenant systems TD and TE illustrated in FIG. 10.

Figure 10:
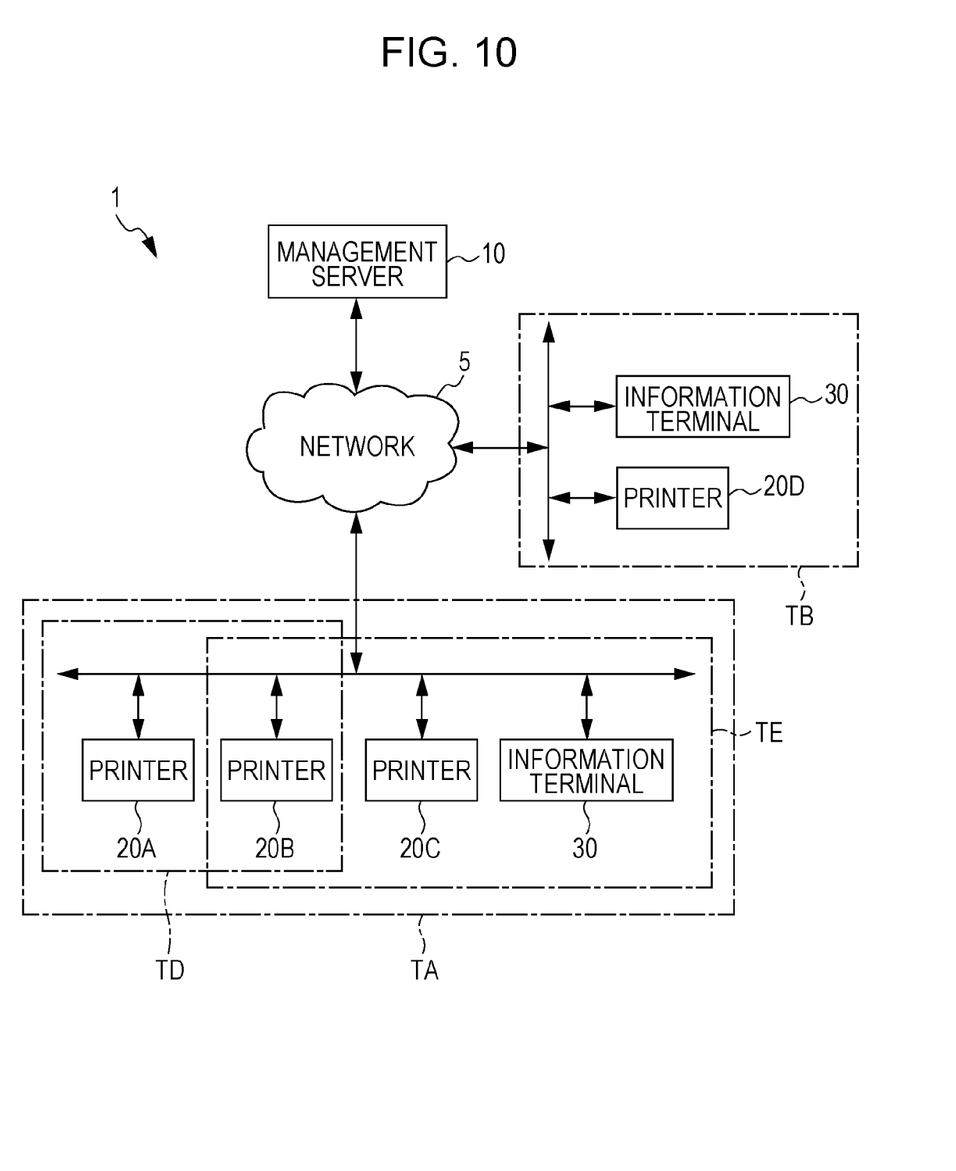
FIG. 10 is a diagram illustrating a configuration of the information processing system in which a tenant system has been divided.

As illustrated in FIG. 10, the tenant system TD includes the printers 20A and 20B, and the tenant system TE includes the printers 20B and 20C. The printer 20B is shared by the tenant systems TD and TE.

Figure 11:
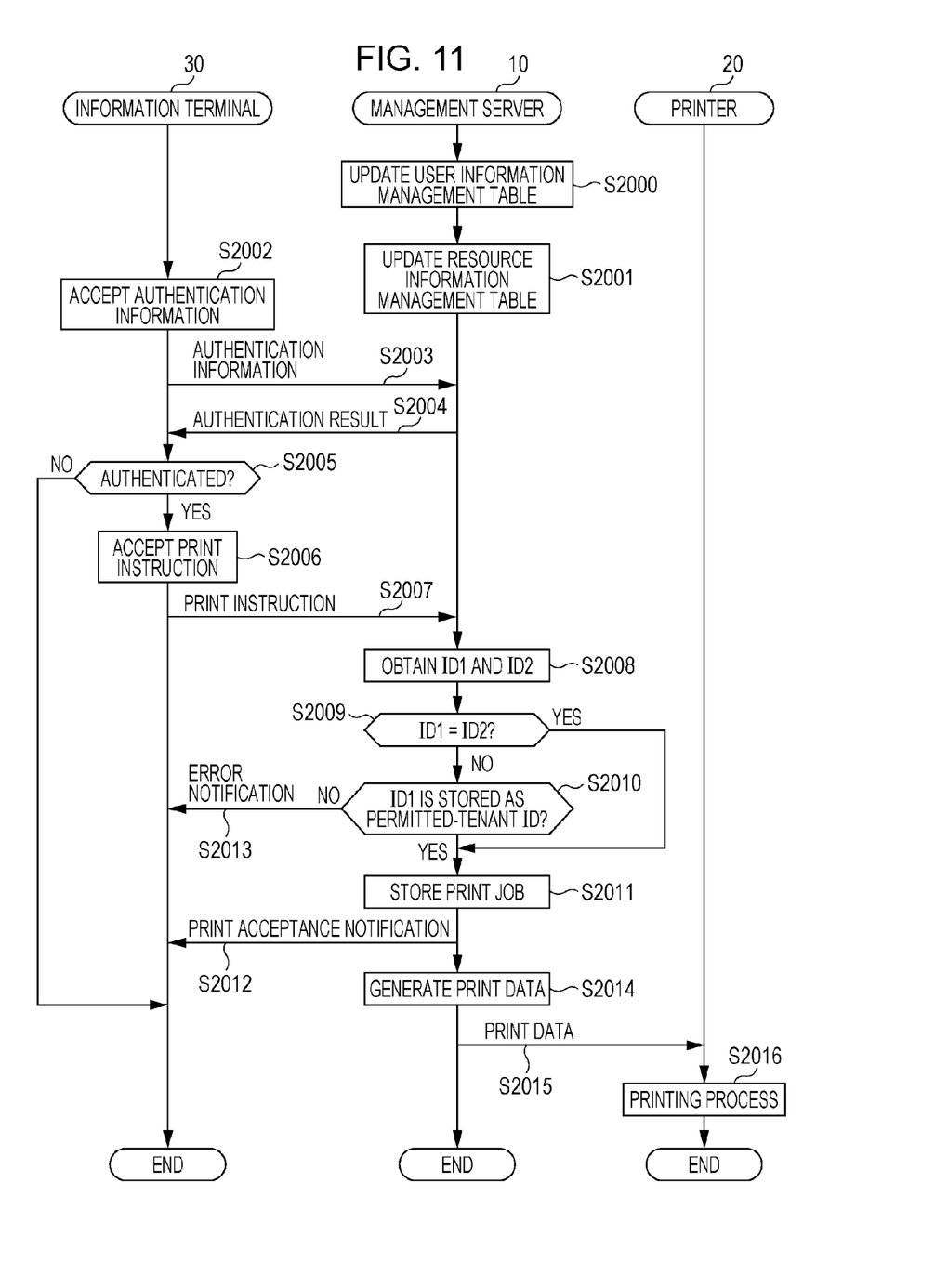
FIG. 11 is a sequence diagram of a process which is performed for dividing a tenant system.

FIG. 11 illustrates a process of dividing the tenant system and a sequence of processing a print request accepted by the management server 10 from the information terminal 30 after the division.

As illustrated in FIG. 11, in the case of dividing the tenant system TA to generate the tenant systems TD and TE, the management server 10 replaces, in step S2000, the tenant IDs corresponding to the user IDs associated with the tenant ID of the tenant system to be divided among the user IDs in the user information management table, with the tenant IDs assigned to the user IDs after division.

Figure 12:
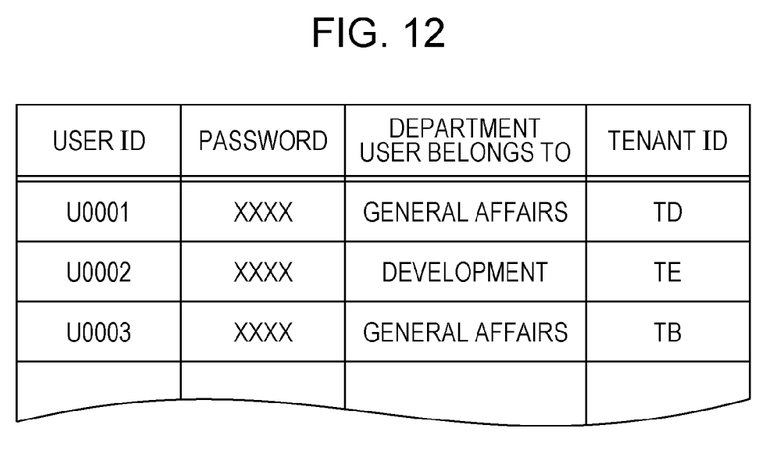
FIG. 12 is a diagram illustrating an example of the user information management table after division.

Specifically, the management server 10 extracts the user IDs corresponding to the tenant ID "TA" (U0001 and U0002) from the user information management table illustrated in FIG. 5, and newly assigns tenant IDs to the extracted user IDs to update the user information management table. FIG. 12 illustrates the updated user information management table. In the example illustrated in FIG. 12, the user ID "U0001" is assigned to the tenant ID "TD", and the user ID "U0002" is assigned to the tenant ID "TE".

In step S2001, the management server 10 stores, in the field of permitted-tenant ID in the resource information management table, new tenant IDs identifying the tenant systems generated through the division, and thereby updates the resource information management table.

Figure 13:
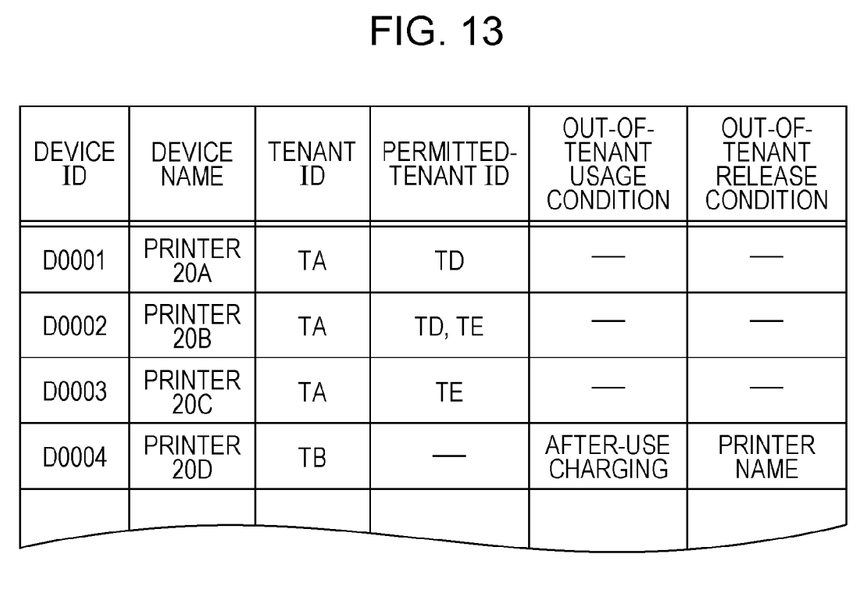
FIG. 13 is a diagram illustrating an example of the resource information management table after integration.

Specifically, as illustrated in FIG. 13, the management server 10 extracts, from the resource information management table, the records (device IDs) containing the tenant ID (TA) of the tenant system to be divided, stores, in the field of permitted-tenant ID of the extracted records (device IDs), the tenant IDs (TD or/and TE) of the tenant systems to which the device IDs belong after division, and thereby updates the resource information management table. In the example illustrated in FIG. 13, the device ID "D0001" is assigned to the tenant ID "TD", the device ID "D0002" is assigned to the tenant IDs "TD" and "TE", and the device ID "D0003" is assigned to the tenant ID "TE".

Subsequently, when the information terminal 30 accepts authentication information (user ID and password) from a user in step S2002, the information terminal 30 transmits the accepted authentication information to the management server 10 in step S2003, so as to request user authentication.

The management server 10 performs user authentication by using the authentication information received from the information terminal 30, and transmits an authentication result to the information terminal 30 in step S2004.

If the authentication result is negative (NO in step S2005), the process ends. If the authentication result is positive (YES in step S2005), the information terminal 30 notifies the user that the user has successfully logged in.

When the information terminal 30 accepts in step S2006, from the user, a print instruction in which the data to be printed and a destination printer are specified, the information terminal 30 transmits the accepted print instruction to the management server 10 in step S2007.

In step S2008, the management server 10 obtains the tenant ID (ID1) associated with the user ID of the authenticated user in the user information management table, and also obtains the tenant ID (ID2) associated with the device ID of the destination printer in the resource information management table. If ID1 is different from ID2 (NO in step S2009), the management server 10 determines in step S2010 whether or not ID1 is stored in the field of permitted-tenant ID corresponding to the device ID of the destination printer in the resource information management table.

If it is determined in step S2009 that ID1 is identical to ID2 (YES in step S2009), or if it is determined in step S2010 that ID1 is stored in the field of permitted-tenant ID corresponding to the device ID of the destination printer in the resource information management table (YES in step S2010), the management server 10 accepts the print instruction regarding the request from the information terminal 30, stores a print job in a spooler in step S2011, and transmits a print acceptance notification to the information terminal 30 in step S2012. If it is determined in step S2010 that ID1 is not stored in the field of permitted-tenant ID corresponding to the device ID of the destination printer in the resource information management table (NO in step S2010), the management server 10 transmits an error notification to the information terminal 30 in step S2013.

In step S2014, the management server 10 generates print data having a format that may be processed by the destination printer, in accordance with the stored print job. The management server 10 monitors the status of the destination printer. When the destination printer becomes capable of processing the print data generated in step S2014, the management server 10 transmits the print data to the printer in step S2015.

The printer performs a printing process by using the print data received from the management server 10 in step S2016, and the process ends.

According to the above-described process, the user information management table and the resource information management table are updated, and thereby system transition may be performed by inheriting the settings that are used before division.

The present invention is not limited to the above-described exemplary embodiment. For example, regarding the above-described exemplary embodiment, description has been given of a control process that is performed in response to a print request from a user. The request accepted from the user is not limited to the print request, but may be a request for registering a printer. In this case, the destination printer specified in the print request may be replaced with the printer to be registered specified in the registration request.

The management server 10 may search, by using a tenant ID associated with a user as a key, the resource information management table for a list of devices including the key in the field of tenant ID or permitted-tenant ID, and may provide the list to a user.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
   a user information management unit that manages information about groups to which individual users belong, in association with user identification information identifying the users;
   a device information management unit that manages, for one device or each of a plurality of devices, information about a main group to which the device belongs and information about a sub-group, which is different from the main group, for which use of the device is permitted, in association with each other;
   a controller that controls, when accepting a request for using a device from an information terminal, use of the device specified by the request in accordance with whether or not information about a group managed by the user information management unit in association with user identification information of a user who operates the information terminal is included in information about the main group or sub-group managed by the device information management unit in association with the device specified by the request;
   a first determining unit that determines whether or not a group to which the user who operates the information terminal belongs matches the main group to which the device specified by the request belongs; and
   a second determining unit that determines, when the first determining unit determines that there is no match, whether or not the group to which the user who operates the information terminal belongs matches any one of sub-groups associated with the device specified by the request,
   wherein the controller permits use of the device specified by the request when any one of the first determining unit and the second determining unit determines that there is a match.

2. The management apparatus according to claim 1, further comprising:
   a device information updating unit that, in the case of integrating a first group and a second group to generate a third group, updates content stored in the device information management unit by assigning information about the third group to the sub-group associated with the device which belongs to the first group or the second group as the main group, among the devices the information of which is managed by the device information management unit.

3. A management apparatus comprising:
   a user information management unit that manages information about groups to which individual users belong, in association with user identification information identifying the users;
   a device information management unit that manages, for one device or each of a plurality of devices, information about a main group to which the device belongs and information about a sub-group, which is different from the main group, for which use of the device is permitted, in association with each other;
   a controller that controls, when accepting a request for using a device from an information terminal, use of the device specified by the request in accordance with whether or not information about a group managed by the user information management unit in association with user identification information of a user who operates the information terminal is included in information about the main group or sub-group managed by the device information management unit in association with the device specified by the request;
a user information updating unit that, in the case of dividing at least a part of a first group into fourth and fifth groups, updates content stored in the user information management unit by changing the content so that at least a part of users who belong to the first group, among the users the information of which is managed by the user information management unit, belongs to the fourth group or the fifth group; and
a device information updating unit that updates content stored in the device information management unit by assigning information about the fourth group and the fifth group to the sub-group associated with the device which belongs to the first group as the main group, among the devices the information of which is managed by the device information management unit.

4. The management apparatus according to claim 1, further comprising:
a user information updating unit that, in the case of dividing at least a part of a first group into fourth and fifth groups, updates content stored in the user information management unit by changing the content so that at least a part of users who belong to the first group, among the users the information of which is managed by the user information management unit, belongs to the fourth group or the fifth group; and
a device information updating unit that updates content stored in the device information management unit by assigning information about the fourth group and the fifth group to the sub-group associated with the device which belongs to the first group as the main group, among the devices the information of which is managed by the device information management unit.

5. A management method comprising:
managing information about groups to which individual users belong, in association with user identification information identifying the users;
managing, for one device or each of a plurality of devices, information about a main group to which the device belongs and information about a sub-group, which is different from the main group, for which use of the device is permitted, in association with each other;
controlling, when accepting a request for using a device from an information terminal, use of the device specified by the request in accordance with whether or not information about a group managed in association with user identification information of a user who operates the information terminal is included in information about the main group or sub-group managed in association with the device specified by the request;
determining, as a first determination, whether or not a group to which the user who operates the information terminal belongs matches the main group to which the device specified by the request belongs;
determining as a second determination, when the first determination is that there is no match, whether or not the group to which the user who operates the information terminal belongs matches any one of sub-groups associated with the device specified by the request; and
permitting use of the device specified by the request when any one of the first determination and the second determination is that that there is a match.

6. A non-transitory computer readable medium storing a program causing a computer to execute a process, the process comprising:
managing information about groups to which individual users belong, in association with user identification information identifying the users;
managing, for one device or each of a plurality of devices, information about a main group to which the device belongs and information about a sub-group, which is different from the main group, for which use of the device is permitted, in association with each other;
controlling, when accepting a request for using a device from an information terminal, use of the device specified by the request in accordance with whether or not information about a group managed in association with user identification information of a user who operates the information terminal is included in information about the main group or sub-group managed in association with the device specified by the request;
determining, as a first determination, whether or not a group to which the user who operates the information terminal belongs matches the main group to which the device specified by the request belongs;
determining as a second determination, when the first determination is that there is no match, whether or not the group to which the user who operates the information terminal belongs matches any one of sub-groups associated with the device specified by the request; and
permitting use of the device specified by the request when any one of the first determination and the second determination is that that there is a match.

7. An information processing system comprising:
one device or a plurality of devices;
a management apparatus; and
an information terminal,
the management apparatus including
a user information management unit that manages information about groups to which individual users belong, in association with user identification information identifying the users;
a device information management unit that manages, for the one device or each of the plurality of devices, information about a main group to which the device belongs and information about a sub-group, which is different from the main group, for which use of the device is permitted, in association with each other;
a controller that controls, when accepting a request for using a device from the information terminal, use of the device specified by the request in accordance with whether or not information about a group managed by the user information management unit in association with user identification information of a user who operates the information terminal is included in information about the main group or sub-group managed by the device information management unit in association with the device specified by the request,
a first determining unit that determines whether or not a group to which the user who operates the information terminal belongs matches the main group to which the device specified by the request belongs; and
a second determining unit that determines, when the first determining unit determines that there is no match, whether or not the group to which the user who operates the information terminal belongs matches any one of sub-groups associated with the device specified by the request,
wherein the controller permits use of the device specified by the request when any one of the first determining unit and the second determining unit determines that there is a match.

* * * * *